United States Patent
Hwang et al.

(10) Patent No.: US 9,360,981 B2
(45) Date of Patent: Jun. 7, 2016

(54) TOUCH PANEL AND APPARATUS FOR DRIVING THEREOF

(71) Applicant: LG Display Co., Ltd., Seoul (KR)

(72) Inventors: Jong Hee Hwang, Goyang-si (KR); Sung Yong Cho, Seoul (KR); Eun Jung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/713,979

(22) Filed: May 15, 2015

(65) Prior Publication Data

US 2016/0062504 A1 Mar. 3, 2016

(30) Foreign Application Priority Data

Aug. 28, 2014 (KR) ........................ 10-2014-0113442

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,510,813 | A | * 4/1996 | Makinwa et al. | 345/173 |
| 6,657,614 | B1 | * 12/2003 | Ito et al. | 345/168 |
| 7,592,901 | B2 | * 9/2009 | Furusho | 340/407.1 |
| 2001/0000961 | A1 | * 5/2001 | Hikida et al. | 345/173 |
| 2010/0263943 | A1 | 10/2010 | Chang et al. | |
| 2012/0075239 | A1 | * 3/2012 | Azumi et al. | 345/174 |
| 2013/0293498 | A1 | 11/2013 | Kim et al. | |
| 2013/0300695 | A1 | * 11/2013 | Cho et al. | 345/173 |
| 2014/0062941 | A1 | 3/2014 | Park | |
| 2014/0240621 | A1 | 8/2014 | Klinghult et al. | |

FOREIGN PATENT DOCUMENTS

CN 101251666 A 8/2008
WO WO 2013/029642 A1 3/2013

OTHER PUBLICATIONS

Extended European Search Report for European Patent Application No. EP 15177653.1, Feb. 1, 2016, 8 Pages.

* cited by examiner

*Primary Examiner* — Van Chow
(74) *Attorney, Agent, or Firm* — Fenwick & West LLP

(57) ABSTRACT

Disclosed is a touch sensing display device capable of sensing both touch position and touch force, shortening a driving time for the touch sensing, and improving touch sensing efficiency, and an apparatus for driving thereof. The display device can include a color filter, a plurality of first touch electrodes for touch force sensing, and a plurality of second touch electrodes for touch position sensing and separated from the first touch electrodes by the color filter. The display can also include a force sensing touch driver for the first touch electrodes and a touch position touch driver for the second touch electrodes.

18 Claims, 11 Drawing Sheets

TOUCH PANEL AND APPARATUS FOR DRIVING THEREOF

CROSS REFERENCE TO RELATED APPLICATIONS

This application claims the priority benefit of the Korean Patent Application No. 10-2014-0113442 filed on Aug. 28, 2014, which is hereby incorporated by reference as if fully set forth herein.

BACKGROUND

1. Field of the Disclosure

Embodiments of the present invention relate to a touch sensing display device including a touch panel, and more particularly, to a touch panel capable of sensing both touch position and touch force, shortening a driving time for the touch sensing, and improving touch sensing efficiency, and an apparatus for driving thereof.

2. Discussion of the Related Art

In substitution for an input device such as a mouse or a keyboard according to the related art, a touch panel is widely used, wherein the touch panel facilitates direct input of information to a screen through the use of finger or pen. Thus, applications of the touch panel are gradually increasing due to an advantage of easy operation.

Recently, when a touch screen is applied to a liquid crystal display (LCD) device, a touch sensor is provided inside a liquid crystal panel so as to obtain slimness. Hereinafter, the touch panel will indicate the liquid crystal panel with the touch sensor provided therein.

According to a touch sensing method, the touch panel may be classified into a resistive type, a capacitance type, and an infrared sensing type. The capacitance touch panel has attracted great attention due to advantages of easy manufacturing and good sensitivity. The capacitance touch panel may be classified into a mutual capacitance type and a self capacitance type.

FIG. 1 is a cross sectional view illustrating a touch panel according to the related art.

Referring to FIG. 1, the touch panel 1 according to the related art may include a lower substrate with a plurality of pixels and a TFT array, an upper substrate with a color filter array, a polarizing film and a glass. On the lower substrate (TFT array substrate), there are a pixel electrode and a common electrode. In this case, the common electrode is used not only as a displaying electrode but also as a touching electrode.

FIG. 2 roughly illustrates touch electrodes of the touch panel according to the related art. The touch panel shown in FIG. 2 corresponds to the touch panel of all point self capacitance touch method for sensing all touch electrodes by the self capacitance method.

Referring to FIG. 2, the plurality of touch electrodes 10 are formed by grouping the common electrodes in a unit of plural pixels. In order to sense a touch in all the touch electrodes 10, each touch electrode 10 is connected with a touch driver 30 through a plurality of conductive lines 20.

In case of the touch panel 1 of all point self capacitance touch method, one frame period is divided into a display period and a touch sensing period, whereby display driving and touch sensing driving are carried out in a time division method.

For the display period, a pixel voltage is supplied to a pixel electrode, and a common voltage is supplied to a common electrode (touch electrode), to thereby display an image. For the touch sensing period, a touch drive signal is supplied to each touch electrode of the common electrode, and then a capacitance for each touch electrode is sensed for sensing whether or not there is a touch and sensing a touch position. For the touch sensing period, a signal is not applied to a thin film transistor (TFT) for each pixel, or a voltage whose level is the same as that of the touch drive signal is applied so as to reduce a parasitic capacitance.

In case of the touch panel 1 of all point self capacitance touch method, a size of touch driver is increased in accordance with the increased number of channels, and a touch efficiency is lowered due to the parasitic capacitance. Also, a touch driving time is increased due to the large number of channels so that it is difficult to secure the touch driving time. Meanwhile, the display period is shortened to sufficiently secure the touch driving time.

Recently, there is an increasing demand for a touch panel which facilitates sensing a touch force as well as the touch position. However, in case of the related art touch panel 1, the common electrode is used as the touch electrode so that it is difficult to sense the touch force due to a structural problem of the touch electrode.

In order to sense the touch force, it is necessary to provide an elastic dielectric on the TFT array substrate. However, the elastic dielectric might cause a problem in the display driving. Thus, there is a limitation on application of the elastic dielectric to the TFT array substrate. Also, a manufacturing process for the elastic dielectric is complicated and a manufacturing cost is also increased. Furthermore, the capacitance is slightly changed by the touch force applied to the elastic dielectric so that it is difficult to realize a required level in the touch force sensing efficiency.

SUMMARY

Accordingly, embodiments of the present invention are directed to a touch panel that substantially obviate one or more problems due to limitations and disadvantages of the related art, and an apparatus for driving thereof.

An aspect of embodiments of the present invention is directed to provide a touch panel capable of sensing both touch position and touch force, and apparatus for driving thereof.

Another aspect of embodiments of the present invention is directed to provide a touch panel capable of shortening a driving time for sensing a touch and improving a touch sensing efficiency, and an apparatus for driving thereof.

Another aspect of embodiments of the present invention is directed to provide a touch panel capable of sufficiently securing a display period and improving a picture quality.

In one embodiment, a touch sensing display device is disclosed. The display device comprises a color filter; a plurality of first touch electrodes for touch force sensing; and a plurality of second touch electrodes for touch position sensing and separated from the first touch electrodes by the color filter.

In one embodiment, the touch sensing display device further comprises a first touch driver to supply at least one first touch driving signal to the first touch electrodes for sensing force level of a touch; and a second touch driver to supply at least one second touch driving signal to the second touch electrodes for sensing position of the touch.

In one embodiment, the touch sensing display device further comprises a cover substrate located on the first touch electrodes. The cover substrate comprising an elastic dielectric layer that changes in thickness due to force of the touch, which allows for force sensing. The elastic dielectric layer can comprise at least one of PDMS (polydimethylsiloxane), acrylic or poly-urethane.

In one embodiment, the touch sensing display device further comprises a plurality of conductive lines coupling the first touch electrodes to a touch driver. Each of the conductive lines is coupled to only a single corresponding first touch electrode of the first touch electrodes.

In one embodiment, groups of the second touch electrodes are connected together as a first plurality of touch electrode lines oriented in a first direction. Groups of the second touch electrodes are connected together as a second plurality of touch electrode lines oriented in a second direction perpendicular to the first direction.

In one embodiment, the first touch electrodes are on-cell type touch electrodes located on the color filter. The second touch electrodes are in-cell type touch electrodes located on a TFT substrate.

In one embodiment, the touch sensing display device further comprises a TFT substrate. The second touch electrodes are located on the TFT substrate. The color filter is located on the second touch electrodes. The first touch electrodes are located on the color filter. A cover substrate is located on the first touch electrodes. The cover substrate comprises an elastic dielectric layer and a cover layer on the elastic dielectric layer.

In another embodiment a touch sensing display device comprises a plurality of first touch electrodes, a plurality of second touch electrodes, a first touch driver to supply at least one first touch driving signal to the first touch electrodes for sensing force level of a touch, and to generate data indicative of a subset of the first touch electrodes corresponding to an area of the touch, a controller to generate, based on the data indicative of the subset of the first touch electrode corresponding to the area of the touch, at least one control signal indicative of a subset of the second touch electrodes corresponding to the area of the touch; and a second touch driver to supply, based on the control signal indicative of the subset of the second touch electrodes corresponding to the area of the touch, at least one second touch driving signal to the subset of the second touch electrodes for sensing a position of the touch.

In one embodiment, the touch sensing display device further comprises a display driving circuit to supply data voltages to data lines of the display device during a first portion of a frame period. Additionally, the first touch driver generates the first touch driving signals during the first portion of a frame period and the second touch driver generates the second touch driving signals during a second portion of the frame period.

In another embodiment, a method of operation in a touch sensing display device is disclosed. The method comprises driving at least one first touch driving signal to the first touch electrodes for sensing force level of a touch, and generating data indicative of a subset of the first touch electrodes corresponding to an area of the touch. The method also comprises generating, based on the data indicative of the subset of the first touch electrode corresponding to the area of the touch, at least one control signal indicative of a subset of the second touch electrodes corresponding to the area of the touch. The method also comprises driving, based on the control signal indicative of the subset of the second touch electrodes corresponding to the area of the touch, at least one second touch driving signal to the subset of the second touch electrodes for sensing a position of the touch.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
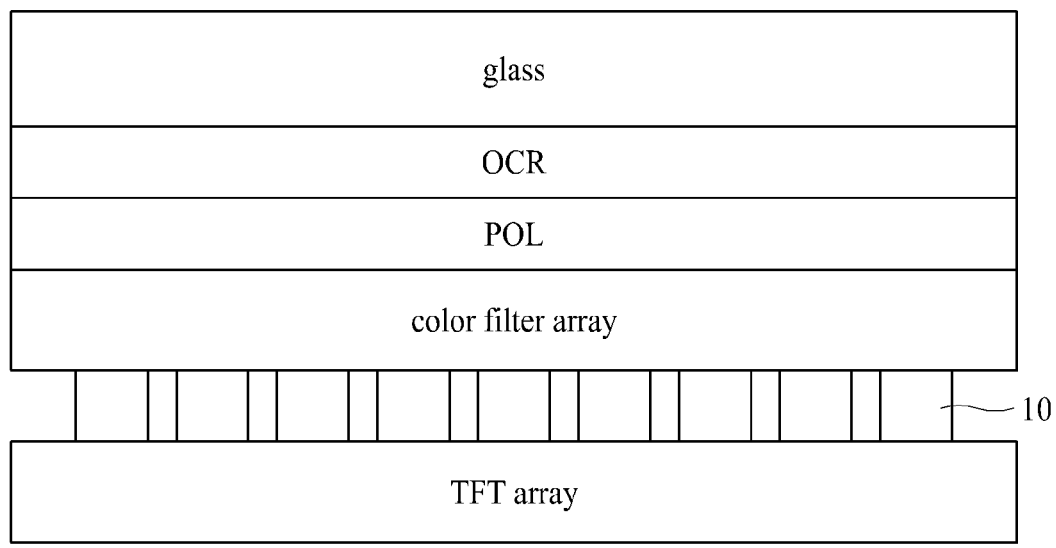
FIG. 1 is a cross sectional view illustrating a touch panel according to the related art.
Figure 2:
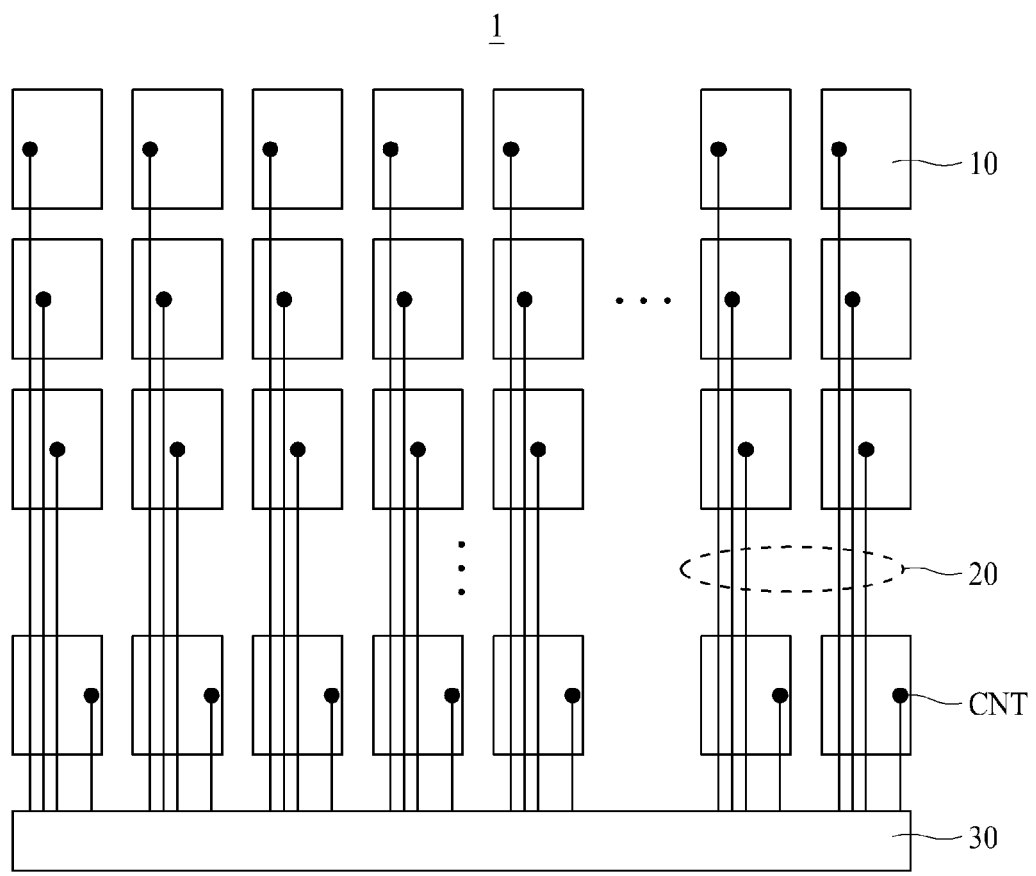
FIG. 2 illustrates touch electrodes of the touch panel according to the related art.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or totally coupled to or combined with each other, and may be variously inter-operated with each other and driven technically as those skilled in the art can sufficiently understand. The embodiments of the present invention may be carried out independently from each other, or may be carried out together in co-dependent relationship.

According to a method for controlling alignment of liquid crystal layer, a liquid crystal display (LCD) device may be classified into Twisted Nematic (TN) type, Vertical Alignment (VA) type, In-Plane Switching (IPS) type, Fringe Field Switching (FFS) type, etc.

In case of the TN type and VA type among the above types, a pixel electrode is formed on a lower substrate, and a common electrode is formed on an upper substrate (color filter array substrate), whereby the alignment of liquid crystal layer is controlled by a vertical electric field.

In case of the IPS type and FFS type among the above types, pixel and common electrodes are formed on a lower substrate, and the alignment of liquid crystal layer is controlled by an electric field formed between the pixel and common electrodes.

In case of the IPS type, the pixel and common electrodes are alternately arranged in parallel so that an in-plane electric field parallel to the substrates occurs between the pixel and common electrodes, to thereby control the alignment of liquid crystal layer. In case of the IPS mode, the alignment of liquid crystal layer is not controlled in the upper portions of the common electrode and pixel electrode, so that a light transmittance is lowered in the upper portions of the common electrode and pixel electrode.

The FFS type has been designed to overcome disadvantages of the IPS type. In case of the FFS type, the pixel and common electrodes are formed with a predetermined interval by an insulating layer interposed therebetween. In this case, one of the pixel and common electrodes is formed in a plate shape or pattern, and the other is formed in a finger shape. Thus, the alignment of liquid crystal layer is controlled by a fringe field occurring between the pixel and common electrodes.

A touch panel according to the embodiment of the present invention may be applicable to both vertical electric field method (TN mode, VA mode) and horizontal electric field method (IPS mode, FFS mode). For the following detailed description, an example using the IPS mode will be described as follows.

Hereinafter, a touch panel according to the embodiment of the present invention and an apparatus for driving thereof will be described with reference to the accompanying drawings.

Figure 3:
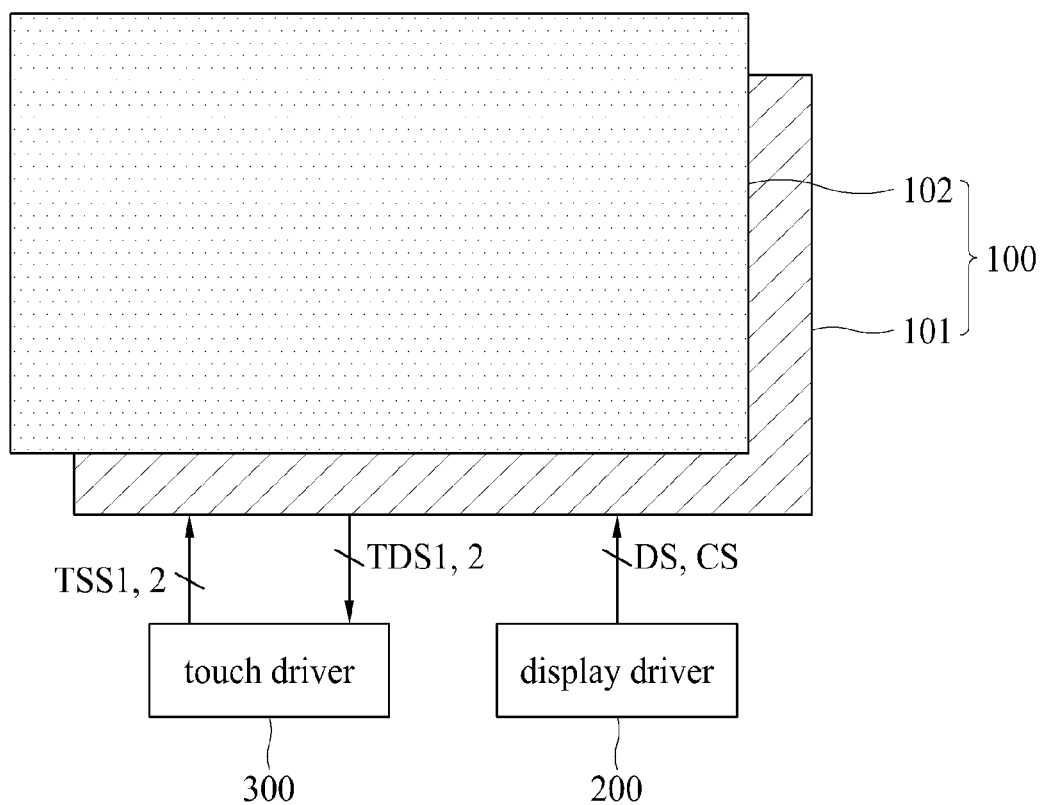
FIG. 3 illustrates a touch panel according to the embodiment of the present invention and an apparatus for driving thereof.
Figure 4:
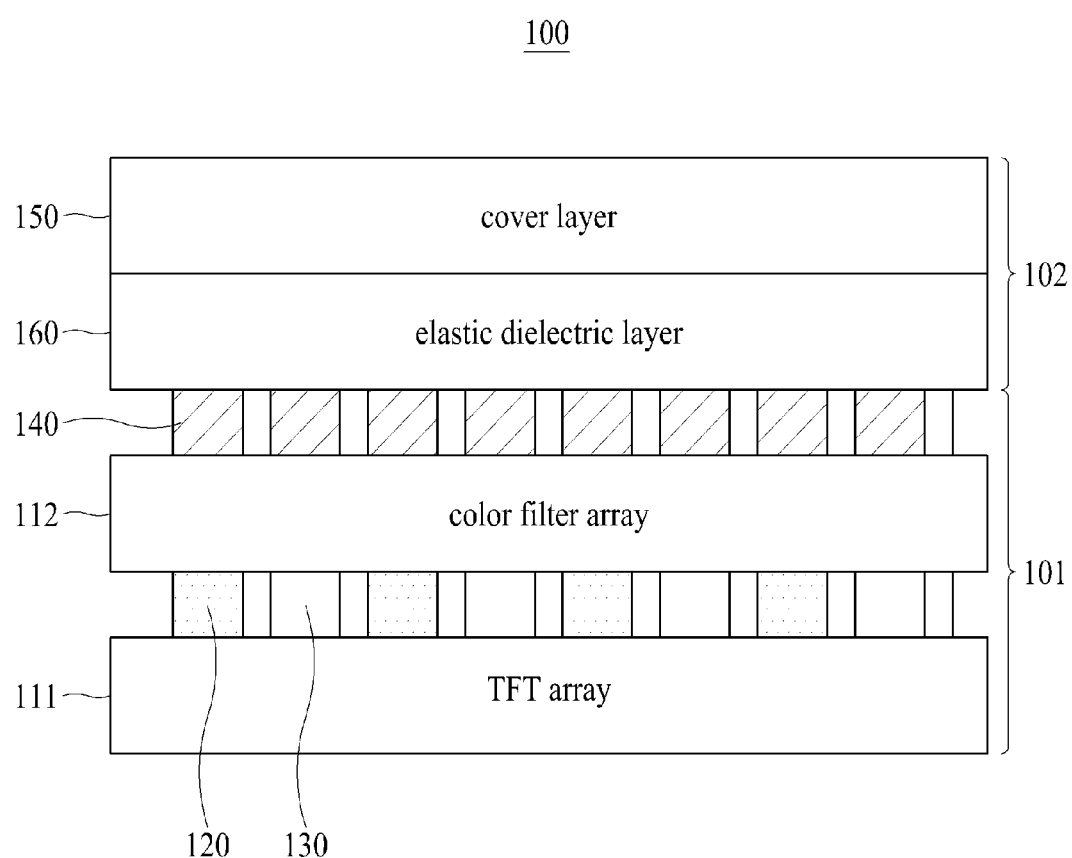
FIG. 4 is a cross sectional view illustrating a touch panel according to the embodiment of the present invention.

FIG. 3 illustrates a touch panel of a touch sensing display device, according to the embodiment of the present invention and an apparatus for driving thereof, and FIG. 4 is a cross sectional view illustrating a touch panel according to the embodiment of the present invention.

Referring to FIGS. 3 and 4, the touch panel 100 according to the embodiment of the present invention may include a display panel 101 with a first touch sensor for sensing a touch force and a second touch sensor for sensing a touch position (coordinates), and a cover substrate 102 with an elastic dielectric layer 160, wherein the elastic dielectric layer 160 may be disposed on a rear surface of a cover layer (protection layer) 150. The elastic dielectric layer changes in thickness when the force of a touch is applied to the display panel 101.

A display driver 200 supplies a data signal (DS) and a control signal (CS) to a plurality of pixels on the display panel 101, whereby an image is displayed on the display panel 101. The display driver 200 may include a gate drive IC, a data drive IC and a timing controller.

A total or partial structure of the display driver 200 may be formed on the display panel 101 by COG (Chip On Glass) or COF (Chip On Flexible Printed Circuit Chip On Film).

The timing controller is a main controller of the touch panel 100. That is, the timing controller controls each driving of the gate drive IC and the data drive IC. Also, the timing controller supplies a timing signal to an apparatus for driving of the touch panel so that the apparatus for driving of the touch panel senses a timing of touch force sensing driving and a timing of touch position sensing driving, to thereby sense both a touch position and a touch force.

The timing controller converts input image signal (data) into digital image data (R, G, B) of a frame unit by the use of a timing signal (TS), and supplies the digital image data to the data drive IC. In this case, the timing signal may include a vertically synchronized signal (V-sync), horizontally synchronized signal (H-sync) and clock signal (CLK).

Also, the timing controller generates a gate control signal (GCS) for controlling the gate drive IC by use of the timing signal, and supplies the generated gate control signal (GCS) to the gate drive IC.

In this case, the data control signal (DCS) may include a source start pulse (SSP), a source sampling clock (SSC), a source output enable (SOE), and a polarity control signal (POL).

Also, the timing controller generates a data control signal (DCS) for controlling the data drive IC by the use of timing signal, and supplies the generated data control signal (DCS) to the data drive IC.

In this case, the gate control signal (GCS) may include a gate start pulse (GSP), a gate shift clock (GSC), and a gate output enable (GOE).

The gate drive IC generates a scan signal (gate driving signal) for driving a thin film transistor (TFT) for each of the pixels on the basis of gate control signal (GCS) supplied from the timing controller.

For the display period of one frame, the gate drive IC sequentially supplies the scan signal to a plurality of gate lines formed in the liquid crystal panel. According as the TFT formed in each pixel is driven by the scan signal, the pixel is switched.

The data drive IC converts the digital image data (R, G, B) supplied from the timing controller to an analog image signal, that is, data voltage. Also, the data drive IC supplies the data voltage to a plurality of data lines formed in the liquid crystal panel at a timing for turning on the TFT of each pixel on the basis of data control signal (DCS) supplied from the timing controller, to thereby display an image.

Referring once again to FIG. 4, the display panel 101 may include a TFT array substrate 111 and a color filter array substrate 112. According as the liquid crystal panel does not emit light in itself, it is necessary to provide a backlight unit, whereby an image is displayed by the use of light emitted from the backlight unit. The backlight unit may include a plurality of backlights (for example, LED or CCFL) for emitting light, and an optical member (light guiding plate or light diffusion plate and a plurality of optical sheets) for guiding the light emitted from the backlight to the liquid crystal panel and improving light efficiency.

On the TFT array substrate 111, there are the plurality of pixels provided in a matrix configuration. Each pixel is defined by the gate and data lines crossing each other. Also, the TFT and storage capacitor (Cst) are formed at every intersection between the gate and data lines.

Also, the pixel and common electrodes are formed in each pixel of the TFT array substrate 111. The pixel and common electrodes may be formed of a transparent conductive material such as ITO (Indium Tin Oxide). The common electrode is used not only as a displaying electrode but also as a touching sensor. To this end, a first touch sensor is formed by grouping the common electrodes in a unit of plural pixels, wherein the first touch sensor includes a plurality of position sensing touch electrodes 120 and 130.

On a rear surface of the color filter array substrate 112, there are red, green and blue color filters for displaying a full-color image, and a black matrix disposed to divide the pixel between each of the color filters. Also, the first touch sensor (e.g., 140) for sensing the touch force is formed on an upper surface of the color filter array substrate 112. The color filter array substrate 112 is thus located between and separates the touch electrodes 120 and 130 and touch electrodes 140.

Figure 5:
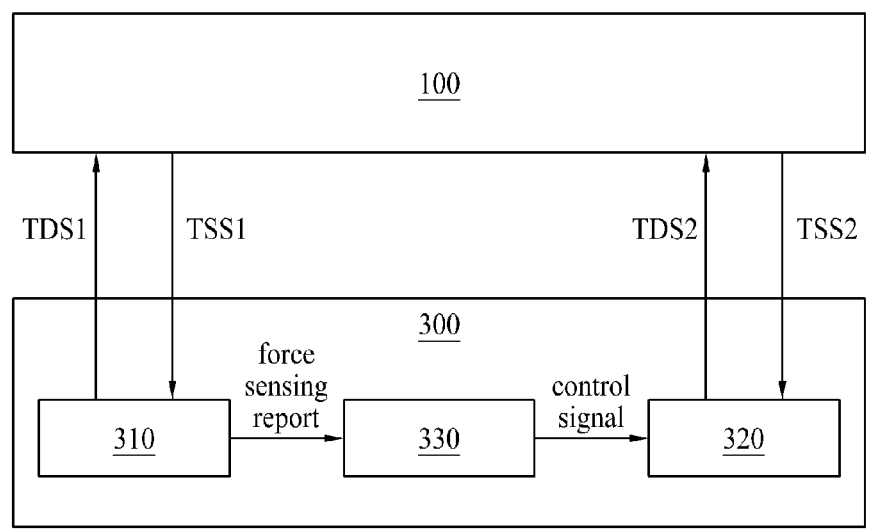
FIG. 5 illustrates an apparatus for driving of touch panel according to the embodiment of the present invention.

FIG. 5 illustrates an apparatus for driving of touch panel according to the embodiment of the present invention.

Referring to FIG. 5, the apparatus 300 for driving of touch panel 100 may include a first touch driver 310, a second touch driver 320 and a controller 330.

The first touch driver 310 supplies a first touch driving signal (TDS1) to all of first force sensing touch electrodes 140, and receives a first touch sensing signal (TSS1) from all of the first touch electrodes 140, to thereby sense a level of the touch force. In this case, the first touch driving signal (TDS1) is a signal supplied to the first touch sensor for sensing the touch force. The first touch driver 310 may be referred to as a touch force driver.

The first touch driver 310 generates force data for the touch force, and supplies the generated force data to the controller 330. Also, the first touch driver 310 supplies a general touch position data showing a subset of the first touch electrodes 140 that has a touch to the controller 330. The general touch position data thus indicates a general area in which the touch may have occurred. The first touch driver 310 supplies the force data for the touch force to the controller 330, and also supplies the general touch position information for the first touch electrode 140 having the touch to the controller 330.

The controller 330 generates a control signal for controlling generation and output of a second touch driving signal (TDS2) generated in the second touch driver 320 on the basis of the force data for touch force sensed in the first touch driver 310 and the general touch position data, and supplies the generated control signal to the second touch driver 320.

The touch occurs in the area of the first touch electrode 140 in which the touch force is sensed. Thus, even though the second touch driving signal (TDS2) is supplied only to a subset of the second and third touch electrodes 120 and 130 corresponding to the first touch electrode 140 in which the touch force is sensed, the touch position can still be accurately sensed.

Accordingly, the control signal includes information about the subset of the second and touch electrodes 120 and 130 corresponding to the general area in which the touch force is sensed, to thereby control generation and output of the second touch driving signal (TDS2).

The second touch driver 320 generates the second touch driving signal (TDS2) based on the control signal supplied from the controller 330, and supplies the second touch driving signal (TDS2) to the second touch sensor. In this case, the second touch driving signal (TDS2) is a signal supplied to the second touch sensor for sensing the touch position. The second touch driver 320 may be referred to as a touch position driver.

The second touch driver 320 may supply the second touch driving signal (TDS2) to a set of the second touch electrodes 120 formed along a first horizontal direction and a set of the third touch electrodes 130 formed in a second vertical direction. However, in order to reduce a touch driving time for sensing the touch position and improve efficiency for sensing the touch position, the second touch driving signal (TDS2) is selectively supplied only to sets of the second and third touch electrodes 120 and 130 corresponding to the first touch electrode 140 in which the touch force is sensed on the basis of the control signal.

The second touch driver 320 receives the second touch sensing signal (TSS2) from the second and third touch electrodes 120 and 130, to thereby sense the touch position.

The apparatus 300 for driving of touch panel may be connected with conductive lines connected with the first and second touch sensors through FPC (Flexible Printed Circuit) formed in the periphery of the touch panel 100.

Figure 6:
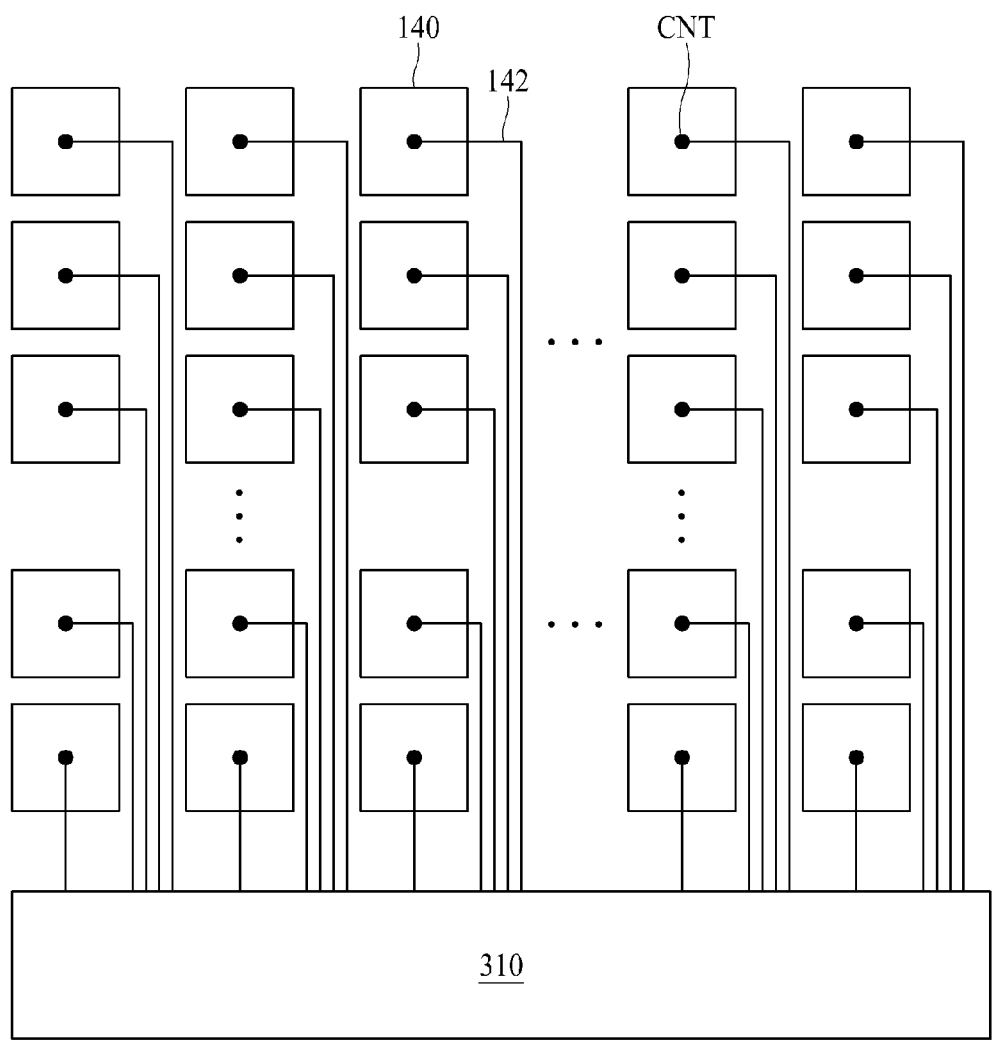
FIG. 6 illustrates first touch sensors for sensing a touch force in the touch panel according to the embodiment of the present invention.

FIG. 6 illustrates the first touch sensors for sensing the touch force in the touch panel according to the embodiment of the present invention.

Referring to FIGS. 4 and 6, the first touch sensor for sensing the touch force is formed on the upper surface of the color filter array substrate 112. The first touch sensor comprises the plurality of first touch electrodes 140.

The plurality of first touch electrodes 140 are formed of a transparent conductive material such as ITO (Indium Tin Oxide). The plurality of first touch electrodes 140 are formed in an area corresponding to the plurality of pixels by patterning the above ITO. The plurality of first touch electrodes 140 are provided to correspond with the second and third touch electrodes 120 and 130 formed on the TFT array substrate 111.

On the upper surface of the color filter array substrate 112, there are a plurality of first conductive lines 142. Through the plurality of first conductive lines 142, each of the first touch electrodes 140 is connected with the first touch driver 310. Each conductive line 142 is coupled to only a single one of the first touch electrodes 140.

The first touch driver 310 supplies the first touch driving signal (TDS1) to each of the first touch electrodes 140 by an all point self capacitance touch method, and senses the touch force by sensing a capacitance in each of the first touch electrodes 140.

In FIG. 6, each of the first touch electrodes 140 is formed in a rectangular shape, but not limited to this shape. Each of the first touch electrodes 140 may be formed in a circular or diamond shape.

Referring once again to FIG. 4, the cover substrate 102 is disposed on a front surface of the display panel 101, and the elastic dielectric layer 160 is disposed on a rear surface of the cover layer 150 of the cover substrate 102.

The cover layer 150, which is disposed in an uppermost portion of the touch panel 100, protects the touch panel 100. The cover layer 150 may be formed of various kinds of material. For example, the cover layer 150 may be formed of glass or tempered glass, or may be formed of plastic plate or film with flexibility.

The elastic dielectric layer 160 is disposed between the cover layer 150 of the cover substrate 102 and the display panel 101 on which first touch sensor for sensing the touch force is formed. The touch force may be sensed by the use of elastic dielectric layer 160.

The elastic dielectric layer 160 may be attached to an upper surface of the plurality of first touch electrodes 140 or a rear surface of the cover layer 150 by the use of transparent adhesive. The elastic dielectric layer 160 may be comprised of a material with elasticity and high dielectric constant, for example, PDMS (polydimethylsiloxane), acrylic or poly-urethane material, but not limited to these materials. The elastic dielectric layer 160 may be formed of any material with elasticity and high dielectric constant.

Figure 7:
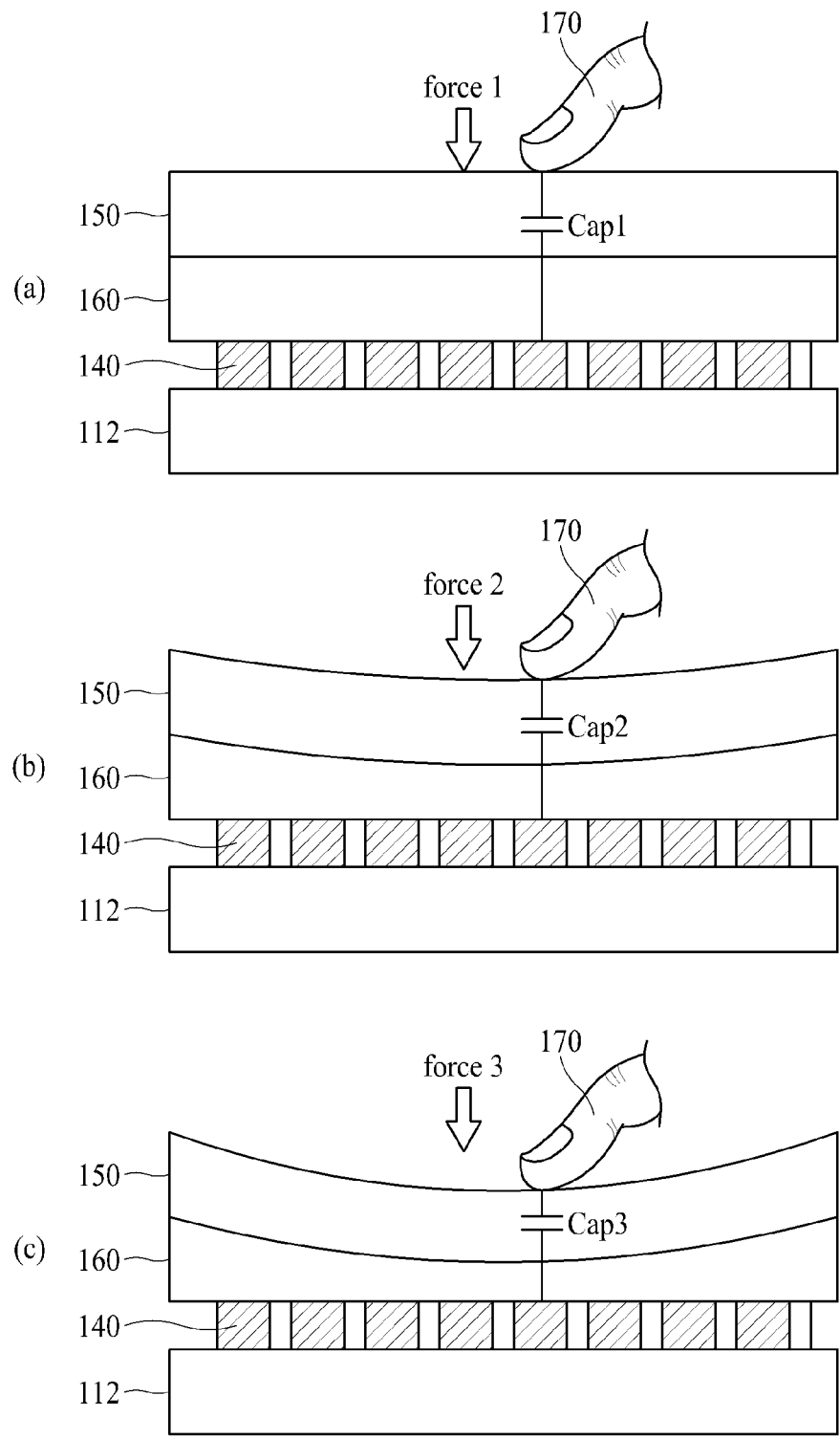
FIG. 7 illustrates a method for sensing the touch force by the use of elastic dielectric layer.

FIG. 7 illustrates a method for sensing the touch force by the use of elastic dielectric layer.

Referring to FIGS. 7(A) to 7(C), the elastic dielectric layer 160 forms a capacitance (Cap1, Cap2, Cap3) between a user's finger 170 and the plurality of first touch electrodes 140 formed on the color filter array substrate 112.

In this case, the elastic dielectric layer 160 is compressed by the force of a user's touch, and thus changes in its thickness to thereby change the capacitance (Cap1, Cap2, Cap3) formed between the finger 170 and the plurality of first touch electrodes 140. In this case, the capacitance (Cap1, Cap2, Cap3) may be changed in accordance with a distance between the finger 170 and the plurality of first touch electrodes 140. Thus, it is possible to sense the touch force in accordance with a pressure of the finger 170 by the use of elastic dielectric layer 160 without additionally providing a complicated sensing circuit.

An area of the first touch electrodes 140 is remains constant regardless of the force of the finger 170. However, the thickness of the elastic dielectric layer 160 is decreased in accordance with the increase of touch force, whereby an area of the finger 170 being in contact with the cover layer 150 is increased.

According as the elastic dielectric layer 160 is pressed by the touch force of finger 170, the distance between the first touch electrodes 140 and the finger 170 is decreased. The capacitance (Cap1, Cap2, Cap3) is inversely proportional to the distance between the electrodes, whereby the capacitance increases as the distance between the first touch electrodes 140 and the finger 170 decreases.

The first capacitance (Cap1) is obtained when it is touched by the finger 170 with a first force with a predetermined level, as shown in FIG. 7(A), and the second capacitance (Cap2) is obtained when it is touched by the finger 170 with a second force whose level is higher than that of the first force, as shown in FIG. 7(B), wherein the second capacitance (Cap2) is larger than the first capacitance (Cap1). Also, the third capacitance (Cap3) is obtained when it is touch by the finger 170 with a third force whose level is higher than that of the second force, as shown in FIG. 7(C), wherein the third capacitance (Cap3) is larger than the second capacitance (Cap2).

Thus, a force level algorithm may be obtained by modeling the variation of capacitance (Cap1, Cap2, Cap3) in accordance with the touch force on the basis of the capacitance changed in accordance with the touch force, whereby the touch force may be sensed through the use of the force level algorithm.

To this end, the first touch driver 310 may include a Look-up Table in which values of the touch force are mapped with values of the capacitance. It is possible to sense the value of touch force corresponding to the value of capacitance sensed in each of the first touch electrodes 140 with reference to the value of touch force shown in the Look-up Table.

Figure 8:
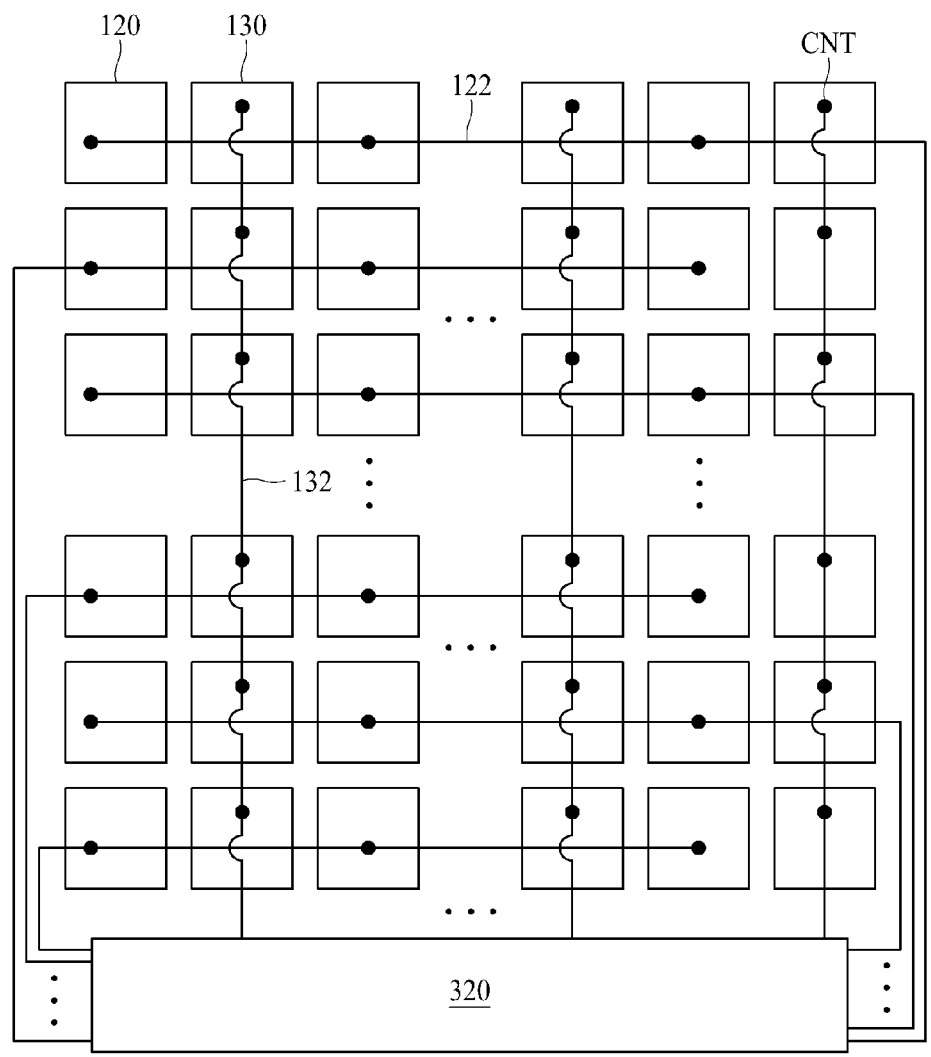
FIG. 8 illustrates second touch sensors for sensing a touch position in the touch panel according to the embodiment of the present invention.

FIG. 8 illustrates the second touch sensors for sensing the touch position in the touch panel according to the embodiment of the present invention.

Referring to FIGS. 4 and 8, in case of the touch panel 100 according to the embodiment of the present invention, the common electrode formed on the lower substrate is used not only as displaying function but also as the second touch sensor for sensing the touch position. That is, the second touch sensor is provided inside the TFT array substrate 101 by an in-cell touch type.

The second touch sensor may include a plurality of touch electrodes 120 and 130. The plurality of touch electrodes 120 and 130 may be formed by grouping the common electrodes in a unit of plural pixels. The touch electrodes 120 and 130 are located in alternating touch electrode columns.

The plurality of second touch electrodes 120 are connected in the first horizontal direction through a plurality of second conductive lines 122. In this case, groups of the second touch electrodes 120 are connected in the first direction line by line. That is, groups of second touch electrodes 120 are connected in the X-axis direction by different conductive lines 122, to thereby form a plurality of touch lines having a bar shape.

When forming the gate line of the TFT array substrate 101, the second conductive line 122 is formed of the same material as the gate line and disposed in the same layer as the gate line, and a via-hole is also formed so that the second touch electrodes 120 are connected with the second conductive line 122 through the via-hole.

The second conductive line 122 is routed in the periphery of the TFT array substrate 101, whereby the second touch driver 320 of the apparatus 300 for driving of touch panel is connected with the plurality of second touch electrodes 120.

The plurality of third touch electrodes 130 are connected in the second vertical direction through a plurality of third conductive lines 132. In this case, groups of the third touch electrodes 130 are connected in the second direction line by line. That is, the plurality of third touch electrodes 130 are connected in the Y-axis direction perpendicular to the X-axis direction by different conductive lines 130, to thereby form a plurality of touch lines in a bar shape.

When forming a source/drain layer of the TFT array substrate 101, the third conductive line 132 is formed of the same material as the source/drain layer and disposed in the same layer as the source/drain layer, and a via-hole is also formed so that the third touch electrodes 130 are connected with the third conductive line 132 through the via-hole. In another aspect, an additional layer for forming the plurality of third conductive lines, instead of the source/drain layer, may be formed and a via-hole may be formed so that the third touch electrodes 130 may be respectively connected with the third conductive lines 132.

The third conductive line 132 is routed in the periphery of the TFT array substrate 101, whereby the second touch driver 320 of the apparatus 300 for driving of touch panel is connected with the plurality of third touch electrodes 130.

The second touch driver 320 supplies the second touch drive signal (TDS2) to one or more second conductive lines 122 for the touch sensing period of one frame, to thereby apply the second touch drive signal (TDS2) to the second touch electrodes 120. In this case, the touch sensing period indicates a period for sensing the touch position.

Also, the second touch driver 320 supplies the second touch drive signal (TDS2) to one or more third conductive lines 132 for the touch sensing period of one frame, to thereby apply the second touch drive signal (TDS2) to the third touch electrodes 130.

In this case, the second touch drive signal (TDS2) is selectively supplied to the second touch electrodes 120 and the third touch electrodes 130. Based on the touch force sensing result of the first touch sensor, the second touch drive signal (TDS2) is supplied to at least one second touch electrode 120 and at least one third touch electrode 130 corresponding to the first touch electrode 140 in which the touch force is sensed.

After the second touch driver 320 applies the second touch drive signal (TDS2) to the second touch electrodes 120 and the third touch electrodes 130, the second touch driver 320 receives the second touch sensing signal (TSS2) through the second and third conductive lines 122 and 132 supplied with the second touch drive signal (TDS2). That is, the second touch driver 320 senses the touch position by sensing the capacitance of the second and third touch electrodes 120 and 130. The second touch electrodes 120 are connected in the X-axis direction, and the third touch electrodes 130 are connected in the Y-axis direction so that it is possible to precisely sense the touch position (coordinates) in a two-dimensional space.

In FIG. 5, each of the plurality of touch electrodes 120 and 130 is formed in a rectangular shape, but not limited to this shape. For example, each of the plurality of touch electrodes 120 and 130 may be formed in a circular or diamond shape.

Referring to FIGS. 4 to 8, in case of the touch panel 100 according to the embodiment of the present invention, the first touch electrodes 140 are formed on the upper surface of the color filter array substrate 112 as on-cell type touch electrodes that do not serve as common electrodes of display pixels. The second and third touch electrodes 120 and 130 are formed on the TFT array substrate 111 as an in-cell type touch electrodes that also serve as common electrodes of display pixels. The elastic dielectric layer 160 is disposed between the cover layer 150 and the display panel 101, whereby the display driving is not affected by the touch force sensing. That is, the touch panel 100 according to the embodiment of the present invention supports image display, touch position sensing and touch force sensing.

A touch sensing method using the apparatus for driving of touch panel according to the embodiment of the present invention will be described with reference to FIGS. 9 to 11.

Figure 9:
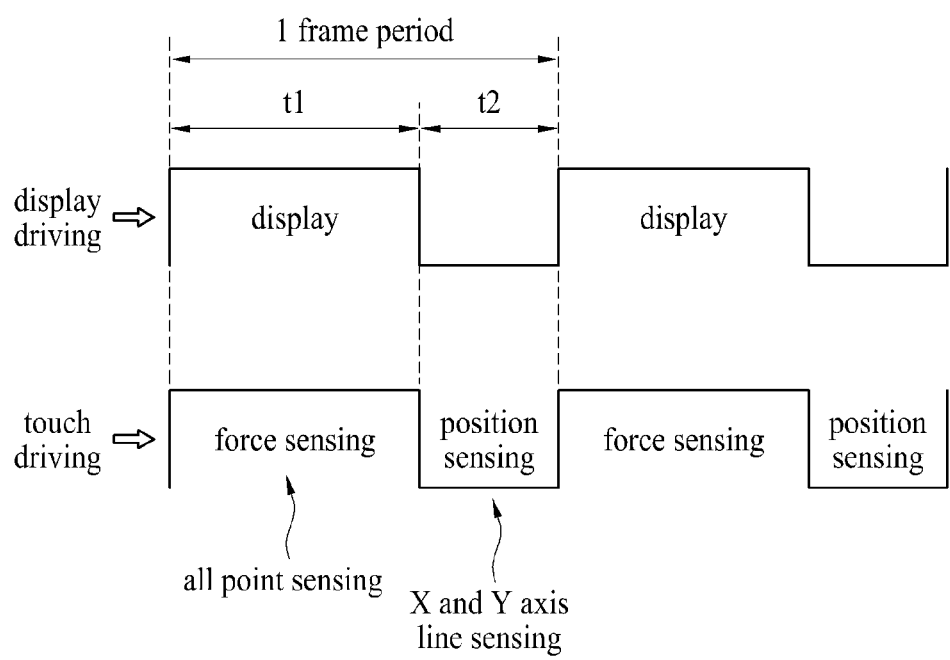
FIGS. 9 to 11 illustrate a touch sensing method using the apparatus for driving of touch panel according to the embodiment of the present invention.

Referring to FIG. 9, on the touch panel, there are the pixel, the TFT array and the color filter array for displaying an image, the first touch sensor for sensing the touch force, and the second touch sensor for sensing the touch position.

The image displaying and touch sensing driving are carried out in the time division method by dividing one frame into a display period (t1) and a touch sensing period (t2). The image displaying and touch force sensing driving are carried out during the display period (t1), and the touch position sensing driving is carried out during the touch sensing period (t2).

In case of the apparatus for driving of touch panel according to the embodiment of the present invention, the touch force is sensed by the all point self capacitance touch method, and the touch position is sensed by the line self capacitance touch method.

Herein, the display period (t1) for sensing the touch force is longer than the touch sensing period (t2) for sensing the touch position so that it is possible to improve a picture quality in the display substrate, and also to improve the touch force sensing efficiency.

As the line self capacitance touch method is applied to the touch position sensing, it is possible to decrease the number of touch lines supplied with the second touch drive signal (TDS2) for sensing the touch position, and to decrease a touch sensing driving time and a hardware size of the apparatus driving the touch panel.

The touch position is sensed by selectively supplying the second touch drive signal (TDS2) to at least one second touch driving electrode 120 and at least one third touch electrode 130 corresponding to the first touch electrode 140 in which the touch force is sensed among all the second touch sensors. Thus, it is possible to decrease the touch position sensing period (t2), and to increase the display period and touch force sensing period (t1) by the decreased time of the touch position sensing period (t2).

In more detail, as shown in FIGS. 5 to 10, the first touch driver 310 supplies the first touch drive signal (TDS1) to all the first touch electrodes 140 of the touch panel 100, and receives the first touch sensing signal (TSS1) from all the first touch electrodes 140, to thereby sense the touch force.

The first touch driver 310 generates the data for the touch force, and supplies the generated data to the controller 330. In this case, the first touch driver 310 supplies the general touch position information for an area of the first touch electrode 140 in which the touch occurs, as well as the data for the touch force, to the controller 330.

The controller 330 generates the control signal for controlling generation and output of the second touch drive signal (TDS2) generated in the second touch driver 320 on the basis of the data of touch force sensed in the first touch driver 310, and supplies the generated control signal to the second touch driver 320. The control signal indicates which subset of the touch electrodes 120 and 130 are in the area of the touch.

The second touch driver 320 generates the second touch drive signal (TDS2) on the basis of control signal supplied from the controller 330, and supplies the second touch drive signal (TDS2) to the second touch sensor.

In order to decrease the touch driving time for sensing the touch position and improve the touch position sensing efficiency, the second touch driver 320 supplies the second touch drive signal (TDS2) to the second touch electrode 120a and third touch electrode 130a corresponding to an area of the first touch electrode 140 in which the touch force is sensed. Meanwhile, the second touch drive signal (TDS2) is not supplied to the second touch electrode 120a and third touch electrode 130a corresponding to areas of the first touch electrode 140 in which the touch force is not sensed.

That is, the second touch drive signal (TDS2) for sensing the touch position is supplied only to the second touch electrode 120a and third touch electrode 130a corresponding to an area in which the touch force is sensed, whereby it is possible to decrease the driving time for sensing the touch position.

Then, the second touch driver 320 receives the second touch sensing signal (TSS2) from the second touch electrode 120a and third touch electrode 130a to which the second touch drive signal (TDS2) is supplied, to thereby sense the touch position.

That is, the precise touch position is sensed by sensing the capacitance of the second touch electrode 120a and third touch electrode 130a to which the second touch drive signal (TDS2) is supplied, and comparing the sensed capacitance with a reference capacitance.

In this case, the area of the first touch electrode 140 in which the touch force is sensed indicates the occurrence of touch therein. Accordingly, even though the second touch drive signal (TDS2) is supplied only to the second touch electrode 120a and third touch electrode 130a corresponding to the first touch electrode 140 in which the touch force is sensed among all the second touch sensors, it is possible to precisely sense the touch position.

Also, the second touch drive signal (TDS2) is supplied to a small number of second touch electrodes 120a and third touch electrodes 130a so that it is possible to reduce a signal interference, to thereby improve touch position sensing efficiency and decrease power consumption.

Figure 10:
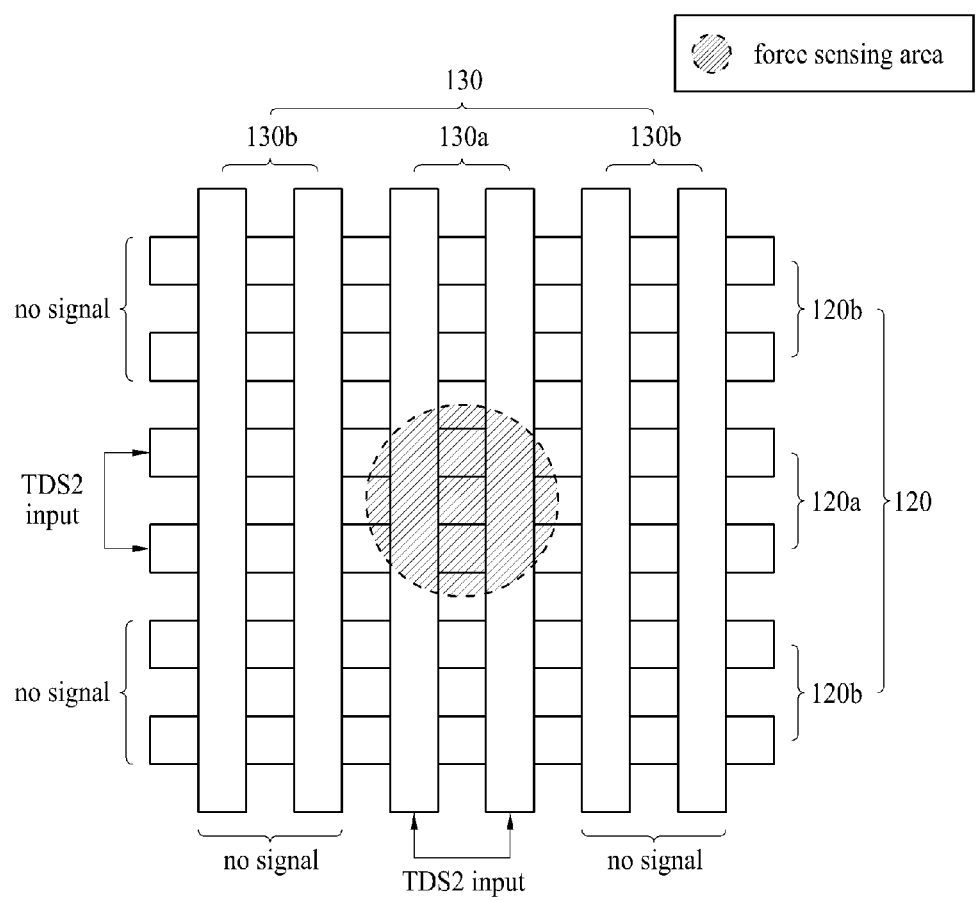

FIG. 10 shows the touch force and touch position sensing method when a single touch occurs in the touch panel. Hereinafter, a touch force and touch position sensing method when a multi-touch occurs in the touch panel will be described with reference to FIGS. 5 and 11.

Figure 11:
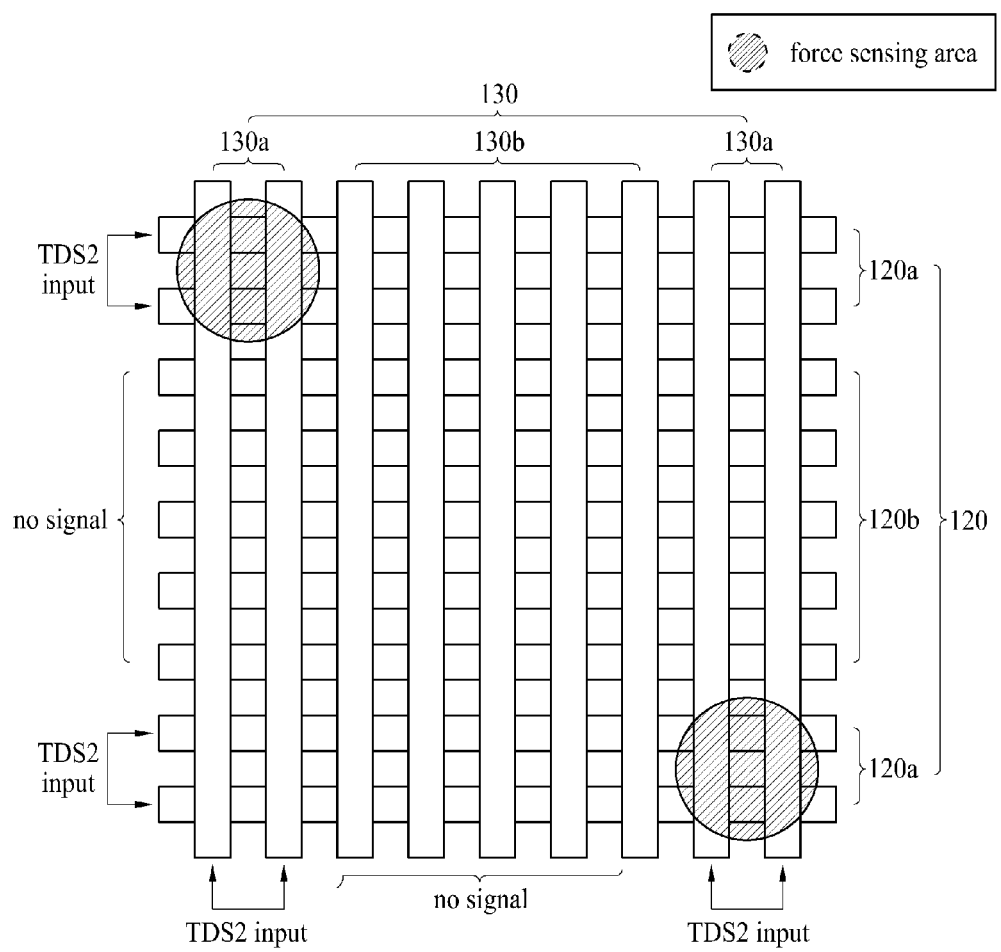

Referring to FIGS. 5 and 11, the first touch driver 310 supplies the first touch drive signal (TDS1) to all the first touch electrodes 140 of the touch panel 100, and receives the first touch sensing signal (TSS1) from all the first touch electrodes 140, to thereby sense the touch force. If a plurality of areas are touched instead of one area, the touch force for the plurality of touches is sensed.

The first touch driver 310 generates data of the touch force for the plurality of touches, and supplies the generated data to the controller 330. The first touch driver 310 supplies general touch position information for the plurality of touch areas, as well as the data of touch force for the plurality of touches, to the controller 330.

The controller 330 generates a control signal for controlling generation and output of the second touch drive signal (TDS2) generated in the second touch driver 320 on the basis of the data of touch force for the plurality of touches and the general touch position information for the plurality of touch areas, and supplies the generated control signal to the second touch driver 320.

The second touch driver 320 generates the second touch drive signal (TDS2) based on the control signal supplied from the controller 330, and supplies the generated second touch drive signal (TDS2) to the second touch sensor.

In order to decrease the touch driving time for sensing the touch position and improve the touch position sensing efficiency, the second touch driver 320 supplies the second touch drive signal (TDS2) to the plurality of second touch electrodes 120a and the plurality of third touch electrodes 130a corresponding to the first touch electrode 140 in which the touch force is sensed. Meanwhile, the second touch drive signal (TDS2) is not supplied to the second touch electrode 120a and third touch electrode 130a corresponding to the first touch electrode 140 in which the touch force is not sensed.

Then, the second touch driver 320 senses the capacitance of the plurality of second touch electrodes 120a and the plurality of third touch electrodes 130a to which the second touch drive signal (TDS2) is supplied, and compares the sensed capacitance with a reference capacitance so that it is possible to precisely sense the position for the plurality of touches.

In this case, the second touch drive signal (TDS2) is selectively supplied to the plurality of second touch electrodes 120a and the plurality of third touch electrodes 130a corresponding to the plurality of areas in which the touch force is sensed among all the second touch sensors, whereby it is possible to precisely sense the touch position.

Basically, the line self capacitance touch method has a limitation on sensing the multi-touch. However, in case of the touch panel according to the embodiment of the present invention and the apparatus for driving thereof, the touch force is sensed by the all point self capacitance touch method using the first touch electrodes, and the touch position is sensed by the line self capacitance touch method based on the touch force sensing result, whereby it is possible to realize the multi-touch sensing.

As the second touch drive signal (TDS2) is supplied only to some of the second touch electrodes 120a and some of the third touch electrodes 130a among all the second and third touch electrodes 120a and 130a, it is possible to reduce signal interference, and furthermore to improve touch position sensing efficiency, and to decrease power consumption.

For one frame period, the driving time (t2) for touch position sensing is decreased, and the display period and touch force sensing period (t1) is increased by the decreased time of the driving time (t2) for touch position sensing so that it is possible to improve the displaying efficiency, and to improve both touch force sensing efficiency and touch position sensing efficiency.

According to the embodiments of the present invention, the touch panel and the apparatus for driving thereof enables both touch position sensing and touch force sensing, and furthermore improves touch force sensing efficiency.

Also, it is possible to decrease the touch driving time for sensing touch position and improve touch position sensing efficiency.

In addition, the touch panel according to the embodiment of the present invention maintains good touch sensing efficiency, and also improves the picture quality by ensuring that the display period is of sufficient length.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A touch sensing display device, comprising:
    a color filter;
    a plurality of first touch electrodes for touch force sensing of a touch;
    a plurality of second touch electrodes for touch position sensing of the touch, the second touch electrodes being further from the touch than the first touch electrodes and separated from the first touch electrodes by the color filter;
    a first touch driver to supply at least one first touch driving signal to the first touch electrodes for sensing force level of the touch; and
    a second touch driver to supply at least one second touch driving signal to the second touch electrodes for sensing position of the touch.

2. The touch sensing display device of claim 1, further comprising:
    a plurality of conductive lines coupling the first touch electrodes to the first touch driver, each of the conductive lines coupled to a single corresponding first touch electrode of the first touch electrodes.

3. The touch sensing display device of claim 1, wherein groups of the second touch electrodes are connected together as a first plurality of touch electrode lines oriented in a first direction and groups of the second touch electrodes are connected together as a second plurality of touch electrode lines oriented in a second direction perpendicular to the first direction.

4. The touch sensing display device of claim 1, wherein the first touch electrodes are on-cell type touch electrodes located on the color filter, and the second touch electrodes are in-cell type touch electrodes located on a TFT substrate.

5. The touch sensing display device of claim 4, wherein the second touch electrodes are also common electrodes of display pixels of the touch sensing display device.

6. The touch sensing display device of claim 1, further comprising:
   a TFT substrate, wherein the second touch electrodes are located on the TFT substrate, the color filter is located on the second touch electrodes, and the first touch electrodes are located on the color filter; and
   a cover substrate located on the first touch electrodes, the cover substrate comprising an elastic dielectric layer and a cover layer on the elastic dielectric layer.

7. A touch sensing display device, comprising:
   a color filter;
   a plurality of first touch electrodes for touch force sensing of a touch;
   a plurality of second touch electrodes for touch position sensing of the touch, the second touch electrodes being further from the touch than the first touch electrodes and separated from the first touch electrodes by the color filter; and
   a cover substrate located on the first touch electrodes, the cover substrate comprising an elastic dielectric layer that changes in thickness due to force of the touch.

8. The touch sensing display device of claim 7, wherein the elastic dielectric layer comprises at least one of PDMS (polydimethylsiloxane), acrylic or poly-urethane.

9. A touch sensing display device, comprising:
   a plurality of first touch electrodes;
   a plurality of second touch electrodes;
   a first touch driver to drive supply at least one first touch driving signal to the first touch electrodes for sensing force level of a touch, and to generate data indicative of a subset of the first touch electrodes corresponding to an area of the touch;
   a controller to generate, based on the data indicative of the subset of the first touch electrodes corresponding the touch, at least one control signal indicative of a subset of the second touch electrodes corresponding to the area of the touch; and
   a second touch driver to supply, based on the control signal indicative of the subset of the second touch electrodes corresponding to the area of the touch, at least one second touch driving signal to the subset of the second touch electrodes for sensing a position of the touch.

10. The touch sensing display device of claim 9, further comprising:
    a color filter separating the first touch electrodes and the second touch electrodes.

11. The touch sensing display device of claim 10, wherein the first touch electrodes are on-cell type touch electrodes located on the color filter, and the second touch electrodes are in-cell type touch electrodes located on a TFT substrate.

12. The touch sensing display device of claim 11, wherein the second touch electrodes are also common electrodes of display pixels of the touch sensing display device.

13. The touch sensing display device of claim 9, further comprising:
    a cover substrate located on the first touch electrodes, the cover substrate comprising an elastic dielectric layer that changes in thickness due to the force of the touch.

14. The touch sensing display device of claim 9, further comprising a plurality of conductive lines coupling the first touch electrodes to the first touch driver, each of the conductive lines coupled to a single corresponding first touch electrode of the first touch electrodes.

15. The touch sensing display device of claim 9, wherein groups of the second touch electrodes are connected together as a first plurality of touch electrode lines oriented in a first direction and groups of the second touch electrodes are connected together as a second plurality of touch electrode lines oriented in a second direction perpendicular to the first direction.

16. The touch sensing display device of claim 9, further comprising:
    a display driving circuit to supply data voltages to data lines of the display device during a first portion of a frame period,
    wherein the first touch driver generates the first touch driving signals during the first portion of a frame period and the second touch driver generates the second touch driving signals during a second portion of the frame period.

17. A method of operation in a touch sensing display device, comprising:
    supplying at least one first touch driving signal to the first touch electrodes for sensing force level of a touch, and generating data indicative of a subset of the first touch electrodes corresponding to an area of the touch;
    generating, based on the data indicative of the subset of the first touch electrode corresponding to the area of the touch, at least one control signal indicative of a subset of the second touch electrodes corresponding to the area of the touch; and
    supplying, based on the control signal indicative of the subset of the second touch electrodes corresponding to the area of the touch, at least one second touch driving signal to the subset of the second touch electrodes for sensing a position of the touch.

18. The method of claim 17, further comprising:
    supplying data voltages to data lines of the display device during a first portion of a frame period,
    wherein the first touch driving signals are driven during the first portion of the frame period, and
    wherein the second touch driving signals are driven during a second portion of the frame period.

* * * * *